United States Patent [19]

Sugiyama

[11] Patent Number: 5,748,784
[45] Date of Patent: May 5, 1998

[54] MOVING IMAGE SIGNAL CODING APPARATUS AND CODED SIGNAL DECODING APPARATUS

[75] Inventor: Kenji Sugiyama, Yokosuka, Japan

[73] Assignee: Victor Company of Japan, Ltd., Yokohama, Japan

[21] Appl. No.: 666,687

[22] Filed: Jun. 17, 1996

Related U.S. Application Data

[63] Continuation of Ser. No. 324,481, Oct. 18, 1994, abandoned, which is a continuation of Ser. No. 972,564, Nov. 6, 1992, abandoned.

[30] Foreign Application Priority Data

Nov. 8, 1991  [JP]  Japan ..................... 3-321368

[51] Int. Cl.$^6$ ................................................. G06K 9/36
[52] U.S. Cl. ............................................ 382/236; 348/415
[58] Field of Search ........................... 382/232, 234, 382/236, 238, 250; 358/342; 348/409, 415, 416, 420, 421, 423, 384

[56] References Cited

U.S. PATENT DOCUMENTS

| | | | |
|---|---|---|---|
| 4,982,285 | 1/1991 | Sugiyama | 358/136 |
| 5,113,255 | 5/1992 | Nagata et al. | 358/136 |
| 5,122,875 | 6/1992 | Raychaudhuri et al. | 358/141 |
| 5,142,360 | 8/1992 | Niihara | 358/136 |
| 5,157,742 | 10/1992 | Niihara | 358/136 |
| 5,170,259 | 12/1992 | Niihara | 358/105 |
| 5,315,326 | 5/1994 | Sugiyama | 348/415 |

OTHER PUBLICATIONS

Verbiest et al "The impact of the ATM Concept on Video coding", Dec. 1988, pp. 1623–1632 IEEE Journal on Selected Areas in Communications.

*Primary Examiner*—Jose L. Couso
*Attorney, Agent, or Firm*—Jacobson, Price, Holman & Stern, PLLC

[57] ABSTRACT

A coding apparatus which codes moving image signals into block units, is configured from a signal processing element which performs motion compensation for moving image signals for over a plural number of frames or fields and codes inter-image signals, and a transfer element which recombines coded information for each block coded by said processing element, into macroblock units which are a plural number of block units of each type of coded information, and transfers them. In addition, a decoding apparatus for moving image signals which have been coded in block units is configured from a detector element which detects transfer code errors for each type of coded information, and a processing element which performs motion compensation and inter-image processing of the coded information using only correct frames which do not include transfer code errors, and without using frames which have transfer code errors, by changing a method of inter-frame processing for motion compensation in accordance with the transfer coding errors in the coded information which has been detected for each type.

13 Claims, 5 Drawing Sheets

EMBODIMENT OF THIS INVENTION

MOVING IMAGE SIGNAL CODING APPARATUS AND CODED SIGNAL DECODING APPARATUS

This is a continuation of application Ser. No. 08/324,481, filed Oct. 18, 1994 which was abandoned upon the filing hereof, and which, in turn, is a continuation of application Ser. No. 07/972,564, filed Nov. 6, 1992 now abandoned.

BACKGROUND OF THE INVENTION

The present invention relates to high-efficiency coding and decoding apparatus which are used in recording, transfer and display apparatus which perform digital signal processing, and which perform efficient coding and decoding, and in particular, to coding and decoding apparatus which perform inter-image processing of moving image signals have small deterioration of image quality even when there are transmission errors.

High-efficiency coding of moving image signals (moving images) can involve interframe predictive coding which uses the correlation between frames of image signals and uses a frame for which coding has been performed, to predict and code only the prediction error. In recent years, motion compensation predictive coding has become the general method used for prediction in accordance with motion of an image.

On the other hand, in coding in which a storage media is the object, intraframe independent coding is performed without interframe prediction for each of several frames and this enables random access and high-speed search.

In addition, there is also known a method such as MPEG (ISO-IEC) which uses skip prediction and pre- and post-prediction between skip predictions to raise the coding efficiency. With the MPEG method, differences in the method of prediction mean that a frame can be an I (intra) frame coded independently within a frame, a P (Prediction) frame which is skip predicted, or a B (Bi-directional) frame which is pre- and post-predicted.

The following is a description of a detailed configuration of a conventional coding apparatus.

FIG. 1 shows an example of the configuration of a coding apparatus of the MPEG type. Here, the frame types of I, P and B cause the changeover switch 2, 4, 22 to be controlled by sync signals separated from input signals, and to be switched to the positions shown in the figure.

Image signals input from an image input terminal 1 are directly led to a predictive, subtracter 5 via the changeover switches 2 and 4 in the case of I or P frames, while B frames are led to the predictive subtracter 5 after having been delayed until there is pre- and post-I and P in a frame memory 3. In the predictive subtracter 5, prediction signals arriving from an adaptive predictor 42 are subtracted from input signals and a prediction residual signal is output to become coded data compressed by coding in an intraframe encoder 6.

In the intraframe encoder 6, DCT (discrete cosine transform) is first performed, and that conversion output is quantized, and given a variable length coding such as Huffman coding or the like. That compressed DCT information is applied to a multiplexer 40 and in the case of I and P frames, is led to an intraframe decoder 21 via the changeover switch 22.

The intraframe decoder 21 first decodes the variable length coding, and replaces the fixed-length codes with quantized representative values, and also performs reverse DCT to obtain the reproduced signals. In the intraframe decoder 21, the reproduced prediction error signals have the prediction signals added in a residual adder 20 to produce the reproduced image signals. The reproduced image signals are stored in a frame memory 19 while the signal that have been stored in the frame memory 19 until that time are transferred to a frame memory 18.

The output of the frame memory 19 is given to a motion compensator 15 and a motion vector detector 17, and the output of the frame memory 18 is given to a motion compensator 14 and the motion vector detector 16.

For each block of 16×16 picture elements, the motion vector estimators 16 and 17 detect the motion vectors between the input signals and the signals given to the frame memories 18 and 19. The motion vector information is given to the motion compensators 14 and 15 and also to a multiplexer 40. The motion compensators 14 and 15 spatially move reproduced image signals stored in the frame memories 18 and 19 by the motion vector portion given from the motion vector detector, and applies them to an adaptive predictor 42.

For the same block as the motion vector detection, the adaptive predictor 42 creates four types of prediction signals from the two signals (F and B) which have been motion compensated, and of those, the optimum prediction signals is decided from matching with the input signals which become the signals to be predicted.

The prediction mode used here is one of the four types of only the "F" (Front: prediction signals from the frame temporally prior) mode, only the "B" (Back: prediction signals from the frame temporally later) mode, the "(F+B) /2" mode or the "0" mode, with the "0" mode being intraframe independent coding. The prediction mode is only the "0" mode for I-frames, the "F" and "0" modes for P-frames, or any of the four modes for B-frames.

The multiplexer 40 recombines the DCT information which is the output of the intraframe encoder 6, the prediction mode information (MODE) which is the output of the adaptive predictor 42, the motion vector information (MVF and MVB) which is the output of the motion vector detector 16, for each block (macroblock: MB) for which the motion vector and the prediction mode have been determined, and outputs them via a data output terminal 12, to the side of a decoding apparatus. FIG. 6A shows the configuration of the data. Here, there is no transfer of the motion vector information not used in the prediction.

The following is a description of a conventional decoding apparatus.

FIG. 2 is a view showing the configuration of a decoding apparatus. Those portions which correspond to portions of the coding apparatus of FIG. 1 are shown with corresponding numerals. The coded data which is input from a data input terminal 30 is disassembled into each information by a demultiplexer 41 and the DCT information is applied to the intraframe decoder 21, the prediction mode information is applied to an adaptive predictor 43, and the motion vector information is applied to the motion compensators 14 and 15.

The DCT information is decoded by the intraframe decoder 21, and prediction signals are added at the residual adder 20 to create the reproduced image signals.

In the case of B-frames, reproduced image signals are immediately outputted from a reproduced image signal output terminal 36 via changeover switches 34 and 35, while I- and P-frames are stored in the frame memory 19. The signals which have been stored in the frame memory 19 up till that time are moved to the frame memory 18 and are outputted from the reproduced image signal output terminal 36 via the changeover switch 35.

The output of the frame memory 19 is applied to the motion compensator 15 while the output of the frame memory 18 is applied to the motion compensator 14. The motion compensators 14 and 15 spatially move the reproduction image signals stored in the frame memory, by the motion vector portion given from the demultiplexer 41, and applies them to the adaptive predictor 43. The adaptive predictor 43 makes the prediction signals from the prediction mode information given from the demultiplexer 41 and outputs it to the residual adder 20.

Here, the inter-image processing units are frames but the description is the same if they are fields of interlace signals.

When there is a coding error between the coding apparatus and its decoding apparatus during transfer or recording, normal demodulation does not occur and there is a deterioration in the image quality. Coding errors result in cell loss in ATM (asynchronous transfer mode) circuits when they occur in normal circuits and recording media, and this loss in cell units becomes a "dropout."

In this case, even for the case of the coding apparatus and the decoding apparatus shown as the conventional example, there is normally detection to the effect that a coding error has occurred and so with prediction residual errors, the prediction residue is not added and the reproduced image signals are the prediction signals only, to result in there being no particularly large deterioration. However, there is absolutely no decoding of a block if there is "dropout" of the motion vector, adjacent blocks and the like are used for interpolation within the same frame and there is no image deterioration as a result.

On the other hand, with a coding method which periodically has independent frames, the deterioration stops with the independent frames and so this method appears advantageous at first. However, coding errors in independent frames can only be compensated for spatially and so there the deterioration becomes large, and the image is influenced later. Furthermore, the amount of data for independent frames is larger than that for prediction frames and so when there are ten independent frames at once, the amount of data is about 40% of the overall amount of data, and the influence of coding errors becomes serious.

SUMMARY OF THE INVENTION

In order to solve the problems described above, the object of the present invention is to provide a moving image coding apparatus and decoding apparatus which always makes a plural number of frames used in interimage processing and transfers information for the motion compensation and inter-image processing method, which detects errors by the decoding apparatus and switches to another frame without the use of a frame which had an error in the inter-image processing for each block, and which has no large image deterioration even if there is a coding error in the transfer path.

In order to attain this objective, as shown in FIG. 3, the present invention is a moving image coding apparatus which codes moving image signals in block units, and is a moving image coding apparatus which has means (a predictive subtracter 5, an adaptive predictor 13, and the like) for motion compensation inter-image processing between a plural number of frames (or fields) and means (memory 7, 8, 9 and 10 and selector 11) for combining coded information for each block and which has been coded by the processing means, for each type of coded information, into a plural number of block units (a plural number of macroblock units) and for then transferring it.

Furthermore, as shown in FIG. 4 for example, the present invention is a moving image decoding apparatus which comprises a decoding apparatus for moving image signals which have been coded in block units, and has means (error detector 38) for detecting transfer coding errors for each type of coded information, and means (adaptive predictor 38, variable adder 33, and the like) for performing motion compensation inter-image processing by changing the method of motion compensation inter-image processing for each block in accordance with errors in each type of coded information which have been detected, and which either does not use decoded signals of frames (or fields) having coding errors and limits use to only decoded signals of correct frames (or fields), or substitutes them with decoded signals of other frames (or fields).

A decoding apparatus always makes a plural number of frames for use in the inter-image processing and recombines the information for that motion compensation and inter-image processing method for each type of information and so it is possible to lower the probability that a plural number of pieces of information of the same block will not be used even if error detection is performed in code units of a certain quantity.

In the decoding apparatus, there is the detection of transfer coding errors for each type of coded information and there is switching to another frame instead of using signals of frames having errors in the information for inter-image processing for each block. There is therefore very little image deterioration.

In the moving image coding apparatus and decoding apparatus of the present invention, the number of frames used for inter-image processing is always made a plural number, and the information for the motion compensation and inter-image processing method is recombined into each type of information and transferred, with errors for each type of information being detected and with inter-image processing for each block being switched to another frame without the use of signals of frames having errors in the information, thereby lowering the probability that a plural number of pieces of information in the same block will not be used even if error detection is performed in code units of a certain amount, and thereby enabling there to be little deterioration of the image quality.

By this, it is possible to not have a large amount of deterioration in the image quality even if there is a large number of errors in the transfer path. Accordingly, coding errors are permissible and it is not necessary to have a large amount of correction coding in the transfer coding, with the result that the amount of data can be reduced.

As has been described above, a moving image coding apparatus and decoding apparatus of the present invention has advantageous effects in its practical application.

DETAILED DESCRIPTION OF THE PREFERRED EMBODIMENTS

The following is a detailed description of the preferred embodiments of the moving image coding apparatus and decoding apparatus of the present invention, with reference to the appended drawings.

First is a description of the coding apparatus of a first embodiment of the present invention.

Figure 1:
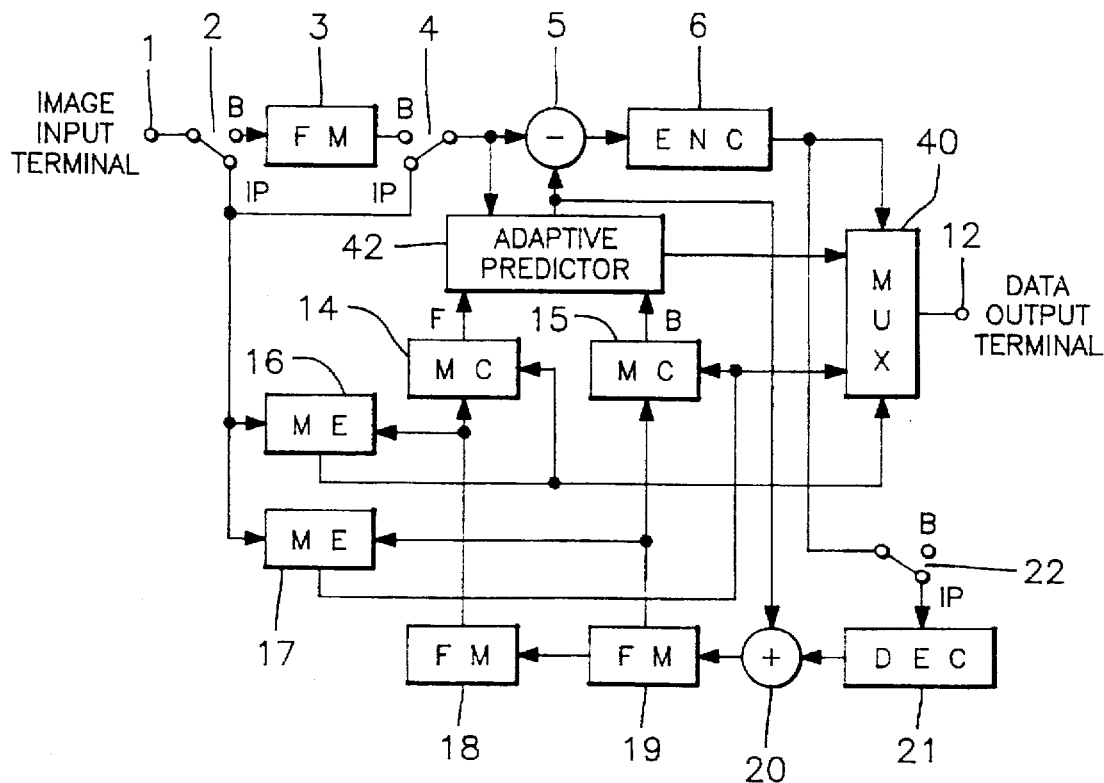
FIG. 1 is a block diagram showing an outline configuration of a conventional moving image signal coding apparatus.
Figure 3:
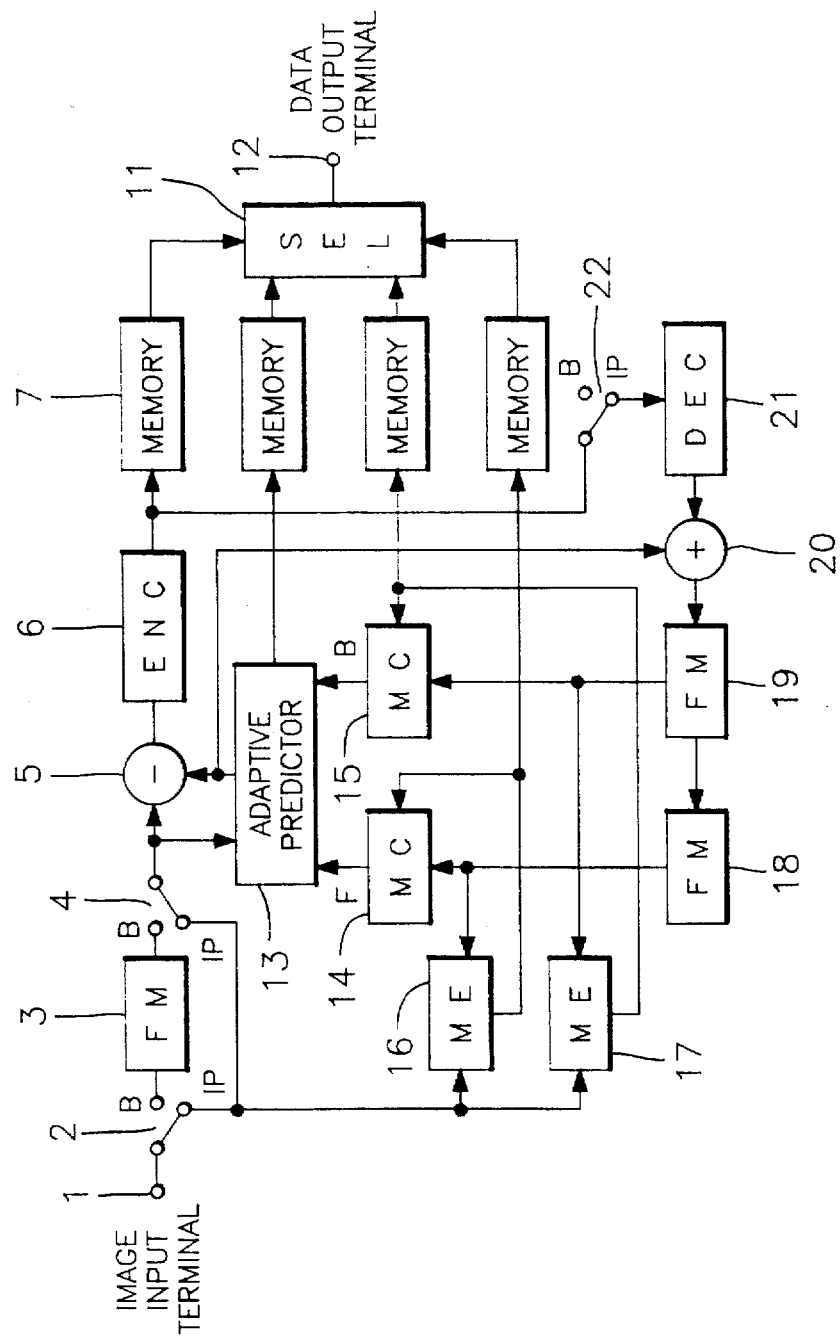
FIG. 3 is a block diagram showing an outline configuration of a moving image signal coding apparatus according to a first embodiment of the present invention.

FIG. 3 is a block diagram showing an outline configuration of a moving image signal coding apparatus according to the first embodiment of the present invention. Those portions which correspond to portions of the coding apparatus of FIG. 1 are shown with corresponding numerals.

In FIG. 3, the coding processing is fundamentally the same, with the operation of the changeover switches 2, 4 and 22, the predictive subtracter 5, the intraframe encoder 6, the intraframe decoder 21, the frame memories 18 and 19, the motion compensators 14 and 15, and the motion vector detectors 16 and 17 being the same (as shown by the dots and the like where there is coding in block units).

This coding apparatus differs from the conventional transfer method (FIG. 2) for each of the information of the DCT information which is the output of the intraframe encoder 6, the prediction mode information (MODE) which is the output of the adaptive predictor 42, and the motion vector information (MVF and MVB) which is the output of the motion vector estimators 16 and 17. More specifically, memories 7, 8, 9 and 10 and the selector 11 are configured so that each of the types of information is recombined in the memories and then transferred.

Figure 6A:
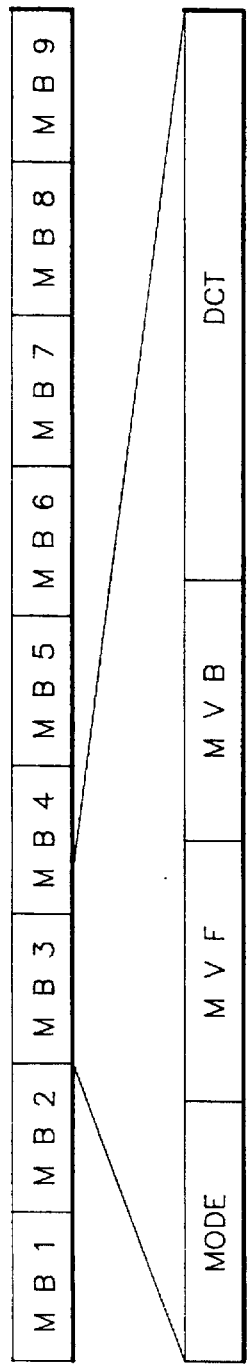
FIGS. 6A and 6B are views showing the data configurations in a conventional coding/decoding apparatus and the coding/decoding apparatus according to the present invention.
Figure 6B:
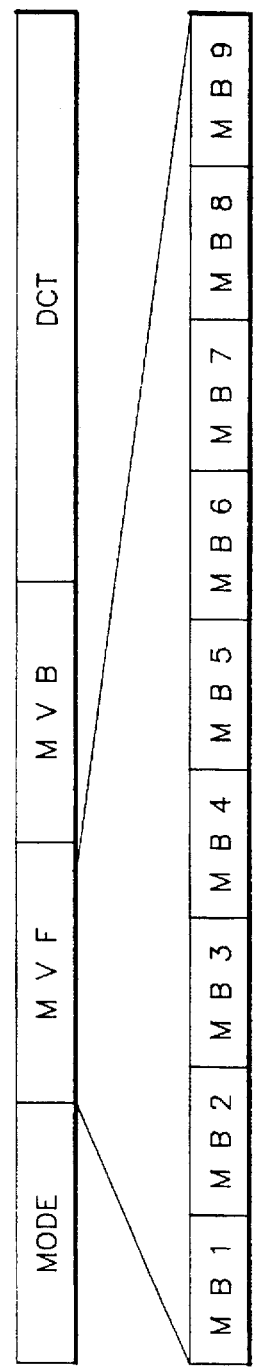

The DCT information which is the output of the intraframe encoder 6, the prediction mode information (MODE) which is the output of an adaptive predictor 13, and the motion vector information (MVF and MVB) which is the output of the motion vector estimators 16 and 17 are all respectively stored once in the memories 7, 8, 19 and 10. Then, at the time when from 30–300 macroblocks have been stored, there is output via the sequential data output 12 selected by the selector 11 and in the format shown in FIG. 6B. The size of the plural number of block units (macroblocks) for each type of the recombined coded information is sufficiently larger than the blocks for error detection, and can be set to a size smaller than the number of blocks of one frame. In this embodiment, dropout in cell units in an ATM circuit is for several macroblocks and the number of blocks of one frame is about 1350 macroblocks and so the size is set to 30–300 macroblocks as described above.

In addition, the adaptive predictor 13 is conventionally used only for the one frame (F-frames) for P frames but in the present embodiment, the configuration enables its use for a plural number of frames (F- and B-frames). Moreover, a motion vector is sent without the use of the predictive mode because of error correspondence in a decoder apparatus.

The following is a description of a decoder apparatus of the first embodiment.

Figure 2:
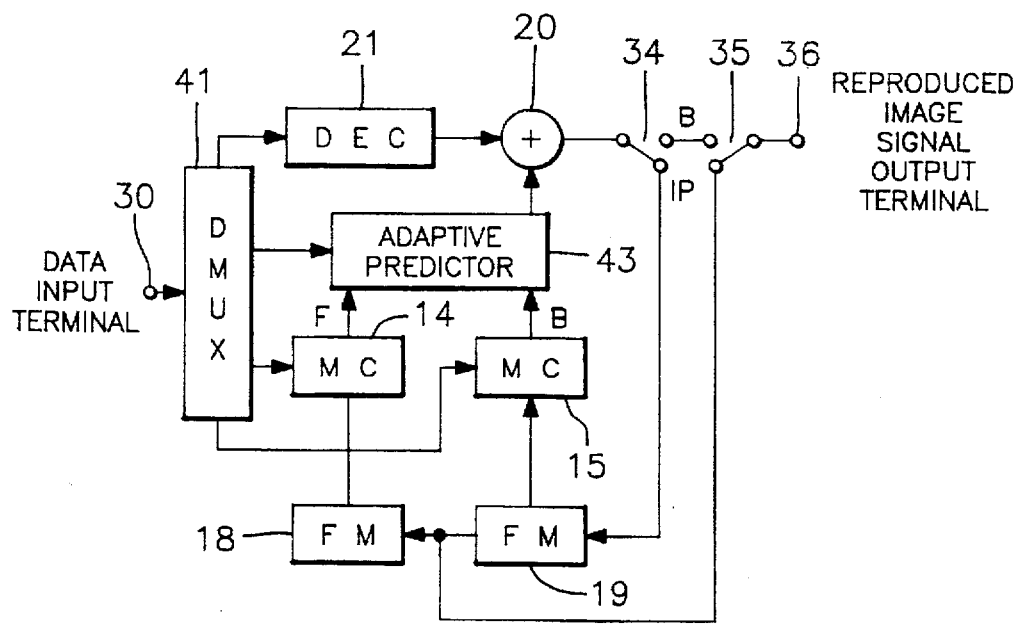
FIG. 2 is a block diagram showing an outline configuration of a conventional moving image signal decoding apparatus.
Figure 4:
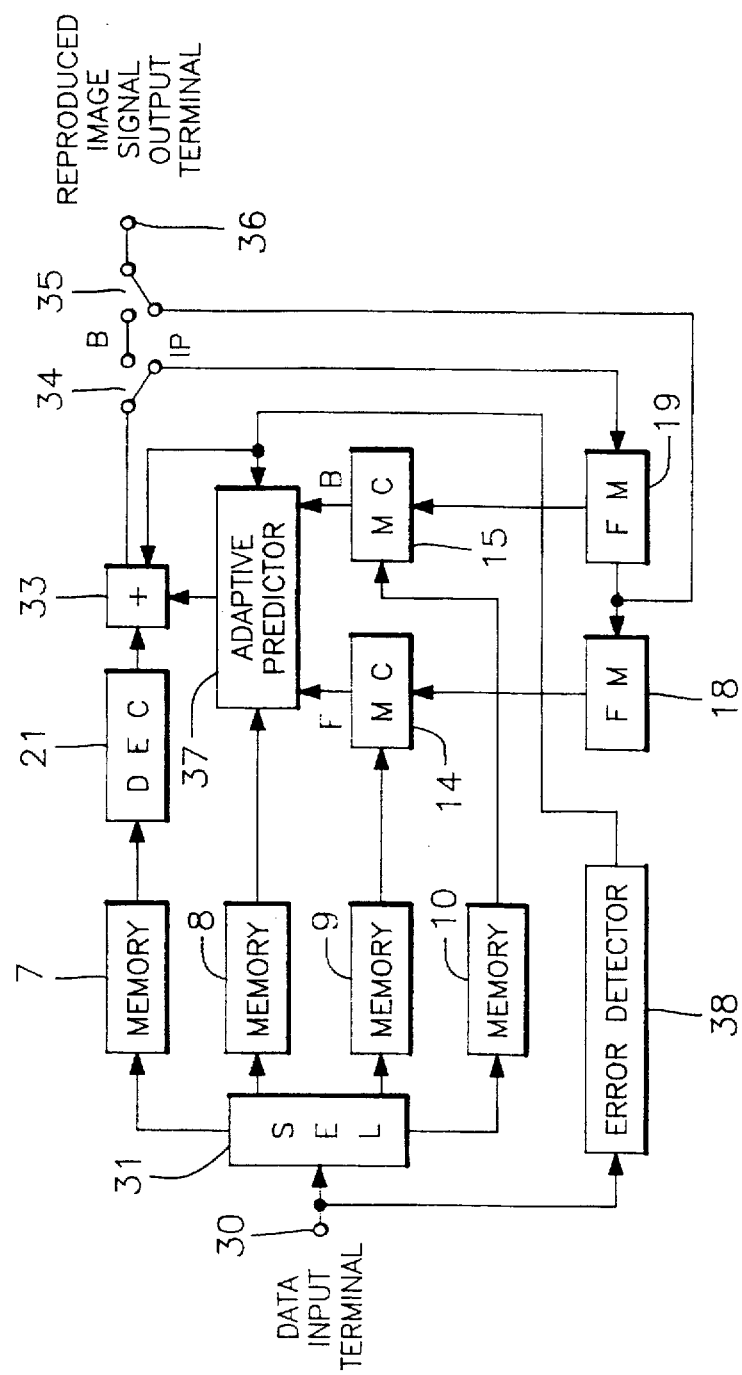
FIG. 4 is a block diagram showing an outline configuration of a moving image signal decoding apparatus according to a first embodiment of the present invention.

FIG. 4 is a block diagram showing an outline configuration of a moving image signal decoding apparatus according to the first embodiment of the present invention. Those portions which correspond to portions of the coding apparatus of FIGS. 2 and 3 are shown by the same numerals. In FIG. 4, the decoding processing is fundamentally the same as that conventional example shown in FIG. 2, and the operation of the changeover switches 34 and 35, the intraframe decoder 21, the frame memories 18 and 19 and the motion compensators 14 and 15 are the same.

The differences with the conventional example (FIG. 2) is that there are the memories 7, 8, 9 and 10, the selector 31, an error detector 38 and a variable adder 33 which changes the gain of the signals from the predictor and the intraframe decoding signals, with there being a different method of handling of each piece of information and different operation for an adaptive predictor 37 and the variable adder 33.

More specifically, the coded data signals are transferred by the coding device and via the data input terminal 30 and arrive at the selector 31 where they are separated into multiplexed DCT information, prediction mode information and motion vector information which are respectively stored in the memories 7, 8, 9 and 10.

Then, the DCT information which is stored in the memory 7 is applied to the intraframe decoder 21, the prediction mode information which is stored in the memory 8 is applied to the adaptive predictor 37, and the motion vector information which is stored in the memories 9 and 10 is applied to the motion compensators 14 and 15.

On the other hand, the error detector 38 decodes the error detection code of the transmission path coding generated by the coding device, and judges the cell loss information for the ATM circuit to decide if there is an error in what type of information for the macroblock. The type of error changes the prediction mode according to the rules shown in Table 1.

In Table 1, C is a current decoding signal which is the output of the intraframe decoder. When there is dropout of mode information, the frame is which of B or F is temporally closer to C.

TABLE 1

| Dropout Information | Image Used |
|---|---|
| DCT | F, B |
| mode | C, B or F |
| MVF | C, B |
| MVB | C, F |

When, as shown in Table 1 which is the error correspondence table, a plural number of images are used when a frame of information has no errors, and an error portion is discarded to use only a correct portion when any frame of information has errors. When there are errors in all of the frames which would have been used, there is also the use of frames which would not have been used. In other words, when an error is obtained in the motion vector MV of frame F even though only the frame F is used in the prediction mode, the intra-image prediction is performed by using the motion vector MV of the frame B which was not originally used. Conversely, under the condition where only the frame B is used in the prediction mode, when the error is obtained in the frame B, the motion vector of the frame F is used despite that the frame F was not originally used. In the present invention, both motion vectors of the frames B and F are transmitted together.

The operation of the variable adder 33 is the same as the residual adder 20 for the conventional example, and when there is dropout of the DCT information, the output of the intraframe decoder 21 is made zero, and the output of the adaptive predictor 37 is output as it is.

In this manner, according to this moving image coding apparatus and decoding apparatus, the number of frames used for inter-image processing is always made a plural number, and the information for the motion compensation and inter-image processing method is recombined into each type of information and transferred, with errors for each type of information being detected and with inter-image processing for each block having switching to another frame without the use of signals of frames having errors in the information, thereby lowering the probability that a plural number of pieces of information in the same block will not be used even if error detection is performed in coding units of a certain amount, and thereby enabling there to be little deterioration of the image quality.

The following is a description of a decoding apparatus of a second embodiment.

The second embodiment of the present invention is applicable to the apparatus "High-efficiency Coding Apparatus and Decoding Apparatus," disclosed in U.S. Ser. No. 07/873,949 filed on Apr. 24, 1992, the inventor of which is the inventor of the invention of the present application.

This embodiment has an improved coding efficiency while at the same time maintaining frame independence, and therefore even uses the inter-frame correlation for I-frames, and performs inter-frame image addition at the decoding apparatus, so that the coding method basically enables the image quality to be maintained even if the quantization is rough.

Figure 5:
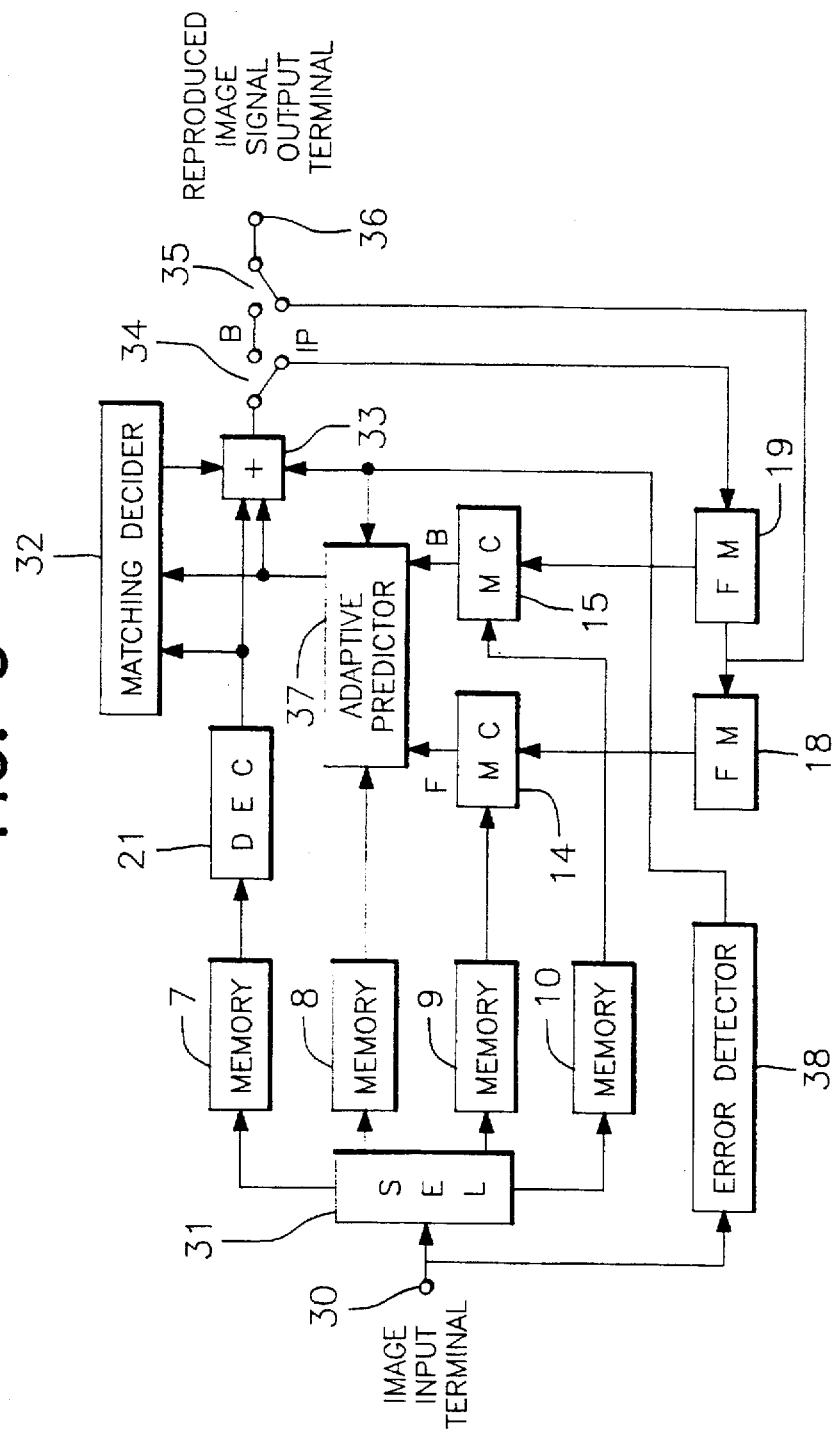
FIG. 5 is a block diagram showing an outline configuration of a moving image signal decoding apparatus according to a second embodiment of the present invention.

The difference with the first embodiment is the decoding apparatus, the configuration of which is shown in FIG. 5. The input data is coded by the coding apparatus shown in FIG. 3. The difference between the decoding apparatus of FIG. 5 and that of FIG. 4 is that there is a matching decider 32 which decides the matching of two images. More specifically, the configuration is such that the output of the intraframe decoder 21 and the output of the reproduced image signal output terminal 36 are both led to the matching decider 32 and the variable adder 33.

In addition, the operation differs from the operation of the first embodiment in that the P- and B-frames are the same for only the I-frames. In the I-frames, the matching decider 32 checks the matching of the two images, and gives that much information to the variable adder 33. In the variable adder 33, the prediction signal from the adaptive predictor 37 is increased when there is good matching, while the current frame signal from the intraframe decoder 21 is increased when there is poor matching, and adding is then performed. Here, the sum of the gains of the respective signals is "1".

When there is an error in the signal from the intraframe decoder, the output of the intraframe decoder 21 is forcedly made "0" and only the output of the adaptive predictor 37 is used as the reproduced signals.

By this, it is possible to compensate for coding errors which have occurred in independent frames.

Moreover, I-frame quantization error compensation can use a coding apparatus in which the second embodiment of the present invention has been applied.

What is claimed is:

1. A coding apparatus for coding moving image signals into block units, comprising:

image processing means for performing motion compensation between a plural number of frames in each block of a plurality of blocks which constitute one image screen, thereby outputting motion vector data, inter-image processing data indicative of what inter-image processing is performed, and image data, respectively;

a plurality of data memory means for storing multiple types of said motion vector data, said inter-image processing data, and said image data; and transfer means for time division multiplexing said multiple types of said motion vector data, said inter-image processing data, and said image data, such that said multiple types of said motion vector data for a group of blocks are time multiplexed together in one time division, the inter-image processing data for said group of blocks is time multiplexed together in another time division, and said image data for said group of blocks is time multiplexed to a further time division, and thereby transferring the multiplexed data.

2. The coding apparatus of claim 1, wherein:

said image processing means comprises:

a first changeover switch which switches signals of a bidirection (B) frame predicted for front and back of image signals supplied via the first changeover switch and an image signal input terminal, and both signals of a skip-predicted prediction (P) frame and an independently-coded intra- (I) frame;

a first frame memory which stores signals of said B-frame so as to delay them until the end of coding of signals of both said I-frame and P-frame;

a second changeover switch which switches B-frame signals from said first frame memory and said I- and P-frame signals switched by said first changeover switch;

first and second motion vector estimators which estimate motion vectors of signals of both said I-frame and said P-frame;

an adaptive predictor which receives signals of frames switched by said second changeover switch;

a residual subtracter which calculates a remainder of signals of frames switched by said second changeover switch, and prediction mode output information output from said adaptive predictor;

an intra-frame coder which codes signals output from said residual subtracter;

a third changeover switch which switches coded signals from said intra-frame coder on the basis of B-frames, and I-frames and P-frames;

an intra-frame decoder which decodes coded signals of each frame and from said third changeover switch;

a residual adder which adds signals from said intra-frame decoder and said adaptive predictor;

a second frame memory which stores one of I-frame and P-frame signals from said adder so as to delay them;

a third frame memory which stores another of I-frame and P-frame signals which have passed through said second frame memory;

said first motion vector estimator which estimates a motion vector of moving image signals for one of I-frames and P-frames said motion vector being supplied via said first changeover switch;

said second motion vector estimator which estimates another motion vector of moving image signals for another of I-frames and P-frames, said other motion vector being supplied via said first changeover switch;

a first motion compensator which performs motion compensation of moving image signals of F-frames, by an output of said third frame memory and an output of said first motion vector estimator; and a second motion compensator which performs motion compensation of moving image signals of B-frames, by an output of said second frame memory and an output of said second motion vector estimator; and wherein said adaptive predictor uses both reproduced image signals which have been moved by a motion vector portion of F-frames and B-frames supplied from said first and second motion compensators and moving image signals supplied via said second changeover switch, as the basis for creating a plural number of prediction signals from a plural number of signals which have been motion compensated by the same clock and for which motion vector detection has been performed, and outputs an optimum prediction signal within said plural number of prediction signals as prediction mode signals to said residual subtracter, said residual adder and said transfer means.

3. The coding apparatus according to claim 2, wherein said plurality of data memory means comprises;

a first memory which stores coded signals output from said intra-frame coder of said processing means;

a second memory which stores prediction mode signals output from said adaptive predictor;

a third memory which stores first motion vector signals output from said first motion vector estimator; and a fourth memory which stores second motion vector signals output from said second motion vector estimator; and wherein said transfer means comprises a coder which successively selects and outputs signals stored in said first through fourth memories in response to a required number of clock pulses.

4. The coding apparatus according to claim 1, wherein said plurality of data memory means comprises:

a first memory which stores coded signals output from said image processing means;

a second memory which stores prediction mode signals output from said image processing means;

a third memory which stores first motion vector signals output from said image processing means; and a fourth memory which stores second motion vector signals output from said image processing means; and wherein said transfer means comprises a selector which successively selects and outputs signals stored in said first through fourth memories in response to a required number of clock pulses.

5. A decoding apparatus for decoding moving image signals coded in block units, comprising:

detection means for receiving input data which includes at least motion vector data, inter-image processing data indicative of what inter-image processing is performed, and image data which are time-division multiplexed and received by the detection means, said detecting means detecting transfer code errors for each of said inter-image processing data and said image data, and outputting the coded information for each data type having said code errors; and processing means for performing motion compensation and inter-image processing of said coded information using only frames which do not include said transfer code error within a plurality of frames which are to be used for prediction purposes, and without the use of frames which have said transfer code errors within said plurality of frames which are to be used for prediction purposes, by selecting a method of inter-frame processing for motion compensation in accordance with said detected transfer code errors, wherein one image screen comprises a plurality of blocks, each block comprises a plurality of frames, and wherein motion compensation and inter-image processing is performed in each block.

6. The decoding apparatus according to claim 5, wherein said processing means uses only those frames which do not have coding errors, to perform motion compensation of said coded information.

7. The decoding apparatus according to claim 5, wherein said detection means comprises an error detector which detects said transfer code errors included in coded information supplied from a coding apparatus via a data input terminal.

8. The decoding apparatus according to claim 5, wherein said processing means comprises:

an adaptive predictor responsive to output of said detection means for generating as output prediction signals from prediction mode information included in said coded information; and a variable adder responsive to output of said detection means and said adaptive predictor for adding decoded signals of said coded information and prediction signals of said adaptive predictor.

9. The decoding apparatus according to claim 5, and further comprising:

a selector which separates DCT (discrete cosine transform) information, prediction mode information, first motion vector information and second motion vector information multiplexed in said coded information signals;

first second, third and fourth memories which respectively store said DCT information, prediction mode information, first motion vector information and second motion vector information separated by selector; and wherein said detecting means comprises:

an error detector which detects transfer code errors in said coded information signals;

an intra-frame decoder which decodes said DCT information stored in said first memory;

a first frame memory;

a second frame memory;

a first motion compensator which uses signals of the first frame memory as the basis for performing motion compensation for said first motion vector information stored in said third memory;

a second motion compensator which uses signals of the second frame memory as the basis for performing motion compensation for said second motion vector information stored in said fourth memory;

an adaptive predictor which uses first and second compensation signals output from said first and second motion compensator, and output signals of said error detector as the basis for generating prediction signals from said prediction mode information stored in said second memory;

a variable adder which adds prediction signals from said adaptive predictor, decoded signals from said intra-frame decoder and output signals of said error detector; and changeover switch means for switching between outputs of said variable adder and which is connected to said first and second frame memory.

10. The decoder apparatus according to claim 9, further provided with a matching decider which judges matching between decoded signals from said intra-frame decoder and prediction signals from said adaptive predictor and outputs to said variable adder.

11. A coding apparatus for coding moving image signals into block units, comprising:

image processing means for dividing one screen into a plurality of blocks, each block comprising a plurality of frames, and performing motion compensation image processing between a plural number of frames in each block, and outputting primary motion vector data which is used for a motion compensation, in said primary motion vector data, in inter-image processing data indicative of what inter-image processing is performed, and in image data;

motion vector detection means for detecting secondary motion vector data which is used in providing error concealment in a decoding apparatus when code errors occur during a data transmission; and transfer means for multiplexing said primary motion vector data, said secondary motion vector data, said inter-image processing data and said image data.

12. A decoding apparatus for decoding moving image signals coded in block units, comprising:

detection means for receiving input data including at least primary motion vector data which is used for motion compensation, inter-image processing data indicative of what inter-image processing is performed, and image data, and for detecting code errors included in said input data;

reception means for receiving secondary motion vector data which is used in providing error concealment in said decoding apparatus only when code errors occur during a data transmission; and image processing means for performing motion compensation and inter-image processing between a plurality of frames that make up a block, and wherein a plurality of blocks make up an image screen, the motion compensation and inter-image processing employing said primary motion vector data only when there is no code error in said input data, and said image processing means performing motion compensation and inter-image processing using said secondary motion vector data when the input data has code errors.

13. A decoding apparatus for decoding moving image signals coded in block units, comprising:

detection means for receiving input data which includes at least motion vector data, inter-image processing data, and image data and which is transferred by time division multiplexing said input data such that said motion vector data for a group of blocks are time multiplexed together in one time division, the inter-image processing data for said group of blocks is time multiplexed together in another time division, and said image data for said group of blocks is time multiplexed to a further time division, said detecting means detecting transfer code errors for each of said inter-image processing data and said image data, and outputting coded information signals for each data type having said code errors:

wherein said detection means comprises an error detector which detects transfer code errors in said coded information signals;

an intra-frame decoder which decodes a discrete cosine transform (DCT) information in a first memory;

a predictor which uses first and second compensation signals output from a first and second motion compensators, respectively, and output signals of said error detector as the basis for generating prediction signals from prediction mode information stored in a second memory; and a variable adder which adds said prediction signals from said predictor, decoded signals from said intra-frame decoder and output signals from said error detector.

* * * * *